United States Patent [19]
Kohn

[11] 4,343,846
[45] Aug. 10, 1982

[54] BALSA-CORE SANDWICH LAMINATE

[75] Inventor: Henri A. Kohn, Northvale, N.J.

[73] Assignee: Baltek Corporation, Northvale, N.J.

[21] Appl. No.: 148,690

[22] Filed: May 12, 1980

[51] Int. Cl.³ .............................................. B32B 3/10
[52] U.S. Cl. .................................. 428/138; 428/131;
428/464; 428/416; 428/537
[58] Field of Search ............... 428/137, 131, 138, 414, 428/416, 464, 537

[56] References Cited

U.S. PATENT DOCUMENTS

| | | | |
|---|---|---|---|
| 1,951,983 | 3/1934 | Kellett | 428/464 X |
| 3,298,892 | 1/1967 | Lippay | 428/53 |
| 3,325,037 | 6/1967 | Kohn et al. | 428/119 X |
| 3,567,563 | 3/1971 | Haudenchild et al. | 428/138 X |
| 3,616,112 | 10/1971 | Desai | 428/255 X |

FOREIGN PATENT DOCUMENTS 223089 1/1962 Austria .............................. 428/138

Primary Examiner—George F. Lesmes
Assistant Examiner—Alexander S. Thomas
Attorney, Agent, or Firm—Michael Ebert

[57] ABSTRACT

A structural sandwich laminate formed of thin facings, such as aluminum or fiberglass sheets, bonded to a core panel. The core panel is formed of end-grain balsa wood having an array of holes punched therein, the holes having their centers on the apexes of a diamond, thereby making possible a high concentration of holes with an adequate separation therebetween to define a reticulated balsa core of high strength and exceptionally light weight.

1 Claim, 9 Drawing Figures

U.S. Patent    Aug. 10, 1982    Sheet 1 of 2    4,343,846
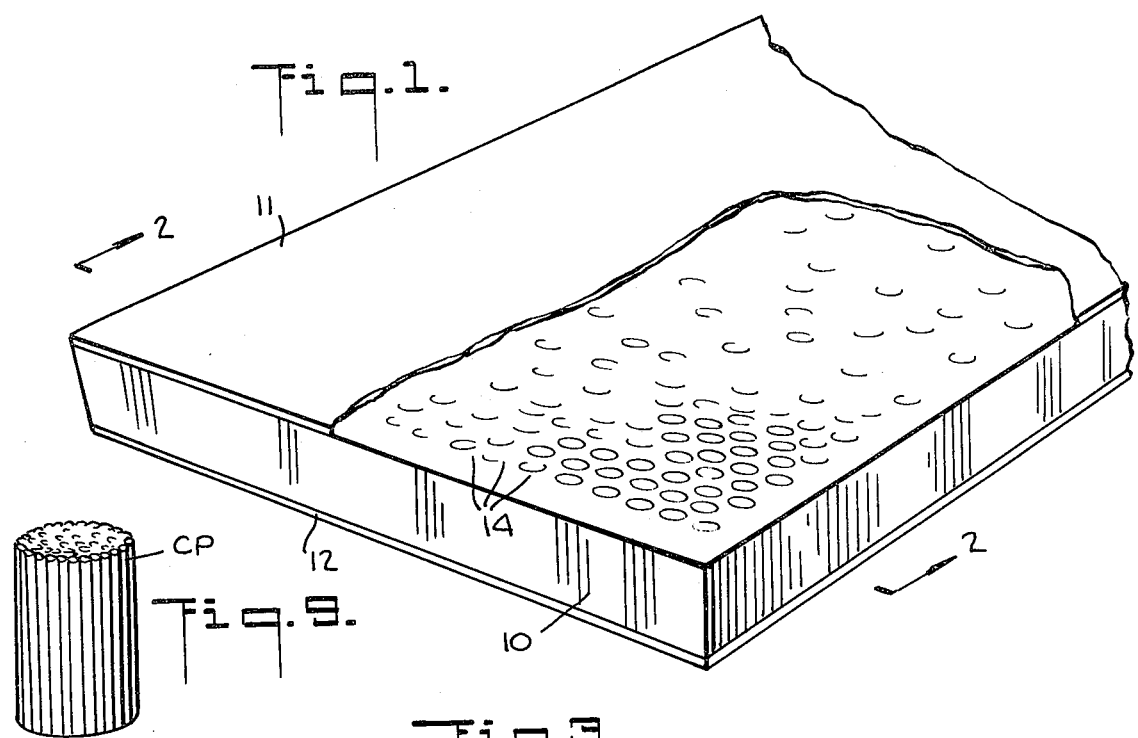
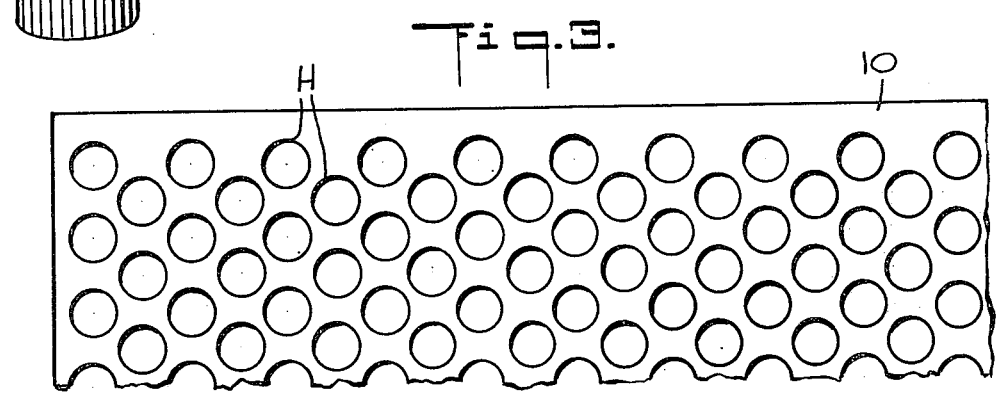
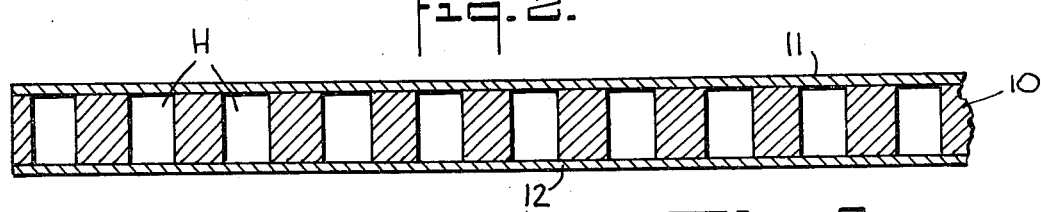
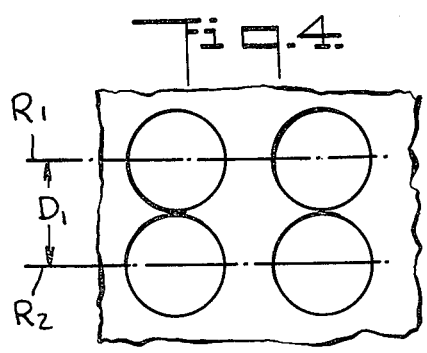
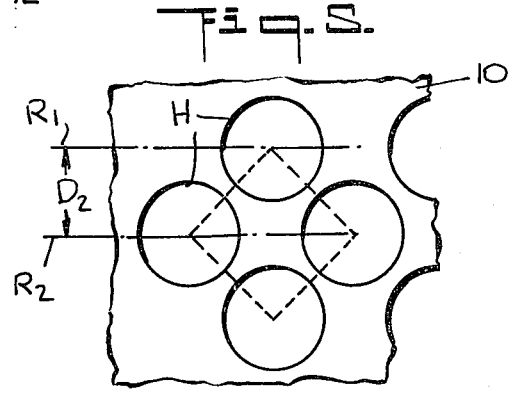

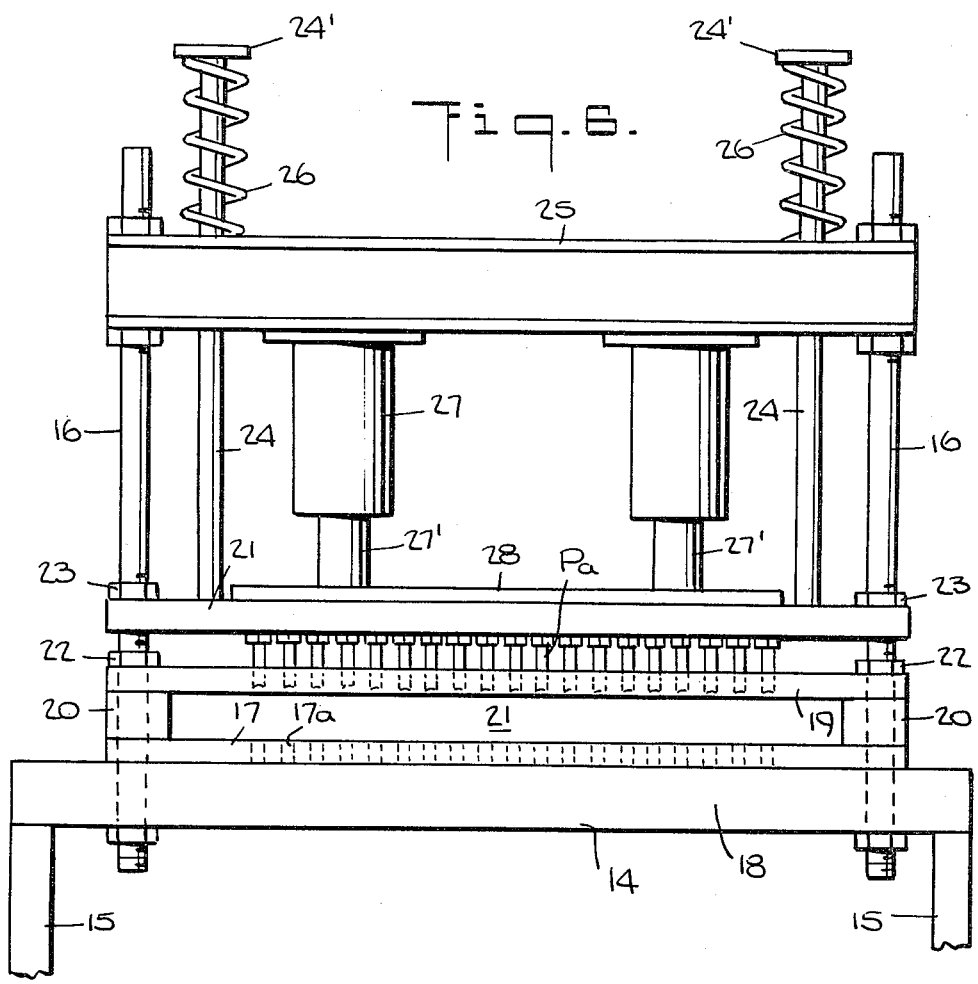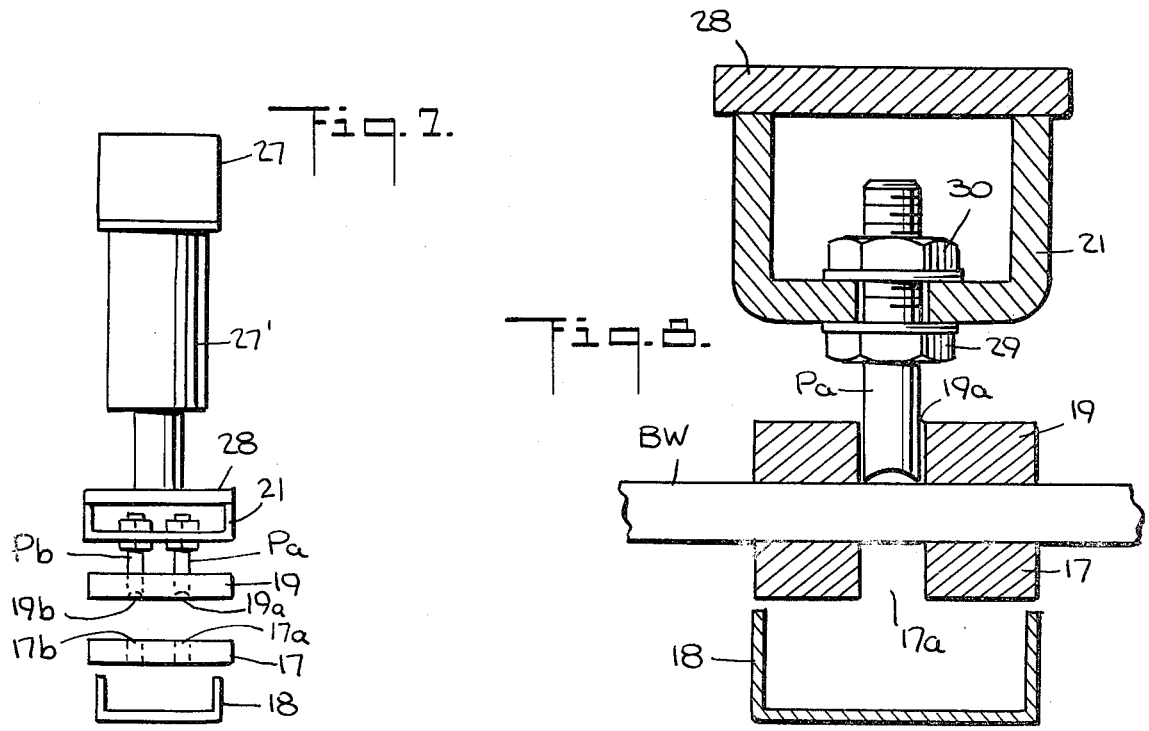

BALSA-CORE SANDWICH LAMINATE

BACKGROUND OF INVENTION

This invention relates generally to structural laminates, and more particularly to a laminate formed by thin facing sheets bonded to a core panel of reticulated end-grain balsa wood to provide a sandwich laminate of exceptionally light weight and high strength.

Balsa has outstanding properties unique in the field of lumber, for on the average it weighs less than nine pounds per cubic foot, this being 40% less than the lightest North American species. Its cell structure affords a combination of high rigidity and compressive and tensile strength that is superior to any composite or synthetic material of equal or higher density. Balsa is dimensionally stable and may be processed by standard woodworking techniques.

It is known that end grain balsa wood is capable of supporting far greater loads than flat-grain material of the same density and that low-density balsa in the end-grain direction will support greater loads than flat grained material of higher density. The cellular structure of balsa is such that the number of cells per cubic foot is extremely high, the wall thickness of each cell being quite thin. The cells are effectively independent of each other, each cell being comparable to an independent column or fiber. The fibers are substantially parallel to each other.

Structural sandwich laminates can be created by bonding thin facings or skins to balsa wood panels which function as a core. Thus the Kohn et al. U.S. Pat. No. 3,325,037 and the Lippay U.S. Pat. No. 3,298,892 disclose structural sandwich laminates whose core is formed of end grain balsa, the resultant laminates having a remarkably high strength-to-weight ratio as well as excellent thermal insulation properties.

End-grain balsa-core sandwich laminates are widely used in transportation and handling equipment, such as for floors of railroad cars, shipping containers, cargo pallets, bulkheads, doors and reefer bodies, as well as in a variety of other applications. These laminates are also employed for structural insulation in aircraft applications, in housing and in boating.

There are certain applications where the weight of existing types of laminates having a solid balsa core still exceeds optimal requirements despite the fact that balsa is inherently of light weight. Thus in aircraft flooring or in radar domes constructed of balsa-wood sandwich laminates, it is desirable that the weight of the laminate be reduced without materially impairing the strength of the laminate.

SUMMARY OF INVENTION

In view of the foregoing, the primary object of this invention is to provide a balsa-cored sandwich laminate of reduced weight and of high structural strength.

Specifically, the object of this invention is to provide a sandwich laminate of the above-noted type which makes use of an end-grain balsa core having a dense array of holes punched therein to form a reticulated, light-weight core.

A significant feature of the invention resides in a technique for punching multiple holes in the balsa core without cracking, fracturing or otherwise degrading the wood, whereby the strength of the core is not markedly reduced.

Also an object of the invention is to provide a gang punching machine through which a balsa core panel is incrementally advanced, the machine being adapted at each step in the advance to punch two rows of holes in staggered relation across the panel. A salient advantage of this punching operation is that the punched holes in the resultant array are highly concentrated, yet have an adequate separation therebetween to define a reticulated balsa core of high strength and exceptionally light weight.

Yet another object of this invention is to provide a technique for effectively laminating aluminum facing sheets to a reticulated end-grain balsa core panel.

Briefly stated, these objects are accomplished in a sandwich laminate having a core panel whose faces have skins bonded thereon, the core panel being formed of end-grain balsa having an array of holes punched therein, the holes having their centers on the apexes of a diamond, making possible a high concentration of holes with an adequate separation therebetween to define a reticulated balsa core.

Aluminum skins are laminated to the balsa core panel by means of a heat-curable epoxy adhesive. The balsa core panel must first be kiln dried so that its residual moisture is below the level at which volatilization of moisture during the curing operation would interfere with lamination. The surface of the aluminum skins must first be etched or otherwise processed to remove the oxide film therefrom before the surfaces are primed and adhesive applied thereto.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a structural sandwich laminate in accordance with the invention, the top skin being cut away to expose the reticulated end-grain balsa core panel;

FIG. 2 is a section taken in the plane indicated by lines 2—2 in FIG. 1;

FIG. 3 is a plan view of the reticulated balsa core panel;

FIG. 4 illustrates the geometric relationship of conventionally punched holes;

FIG. 5 illustrates the geometric relation of the punched holes in the core panel in accordance with the invention;

FIG. 6 is a plan view of a gang-punch machine in accordance with the invention for punching the holes in the core panel;

FIG. 7 is a side view of the machine;

FIG. 8 is an enlarged view of the punch and die assembly; and

FIG. 9 is a perspective view of an end grain balsa plug punched out of the panel.

DESCRIPTION OF INVENTION

The Laminate

Referring now to the drawings and more particularly to FIGS. 1, 2 and 3, there is shown a structural laminate in accordance with the invention, the laminate consisting of a rectangular balsa core panel 10 to whose opposing faces are laminated skins 11 and 12, which in practice may be constituted by aluminum, stainless steel or fiberglass sheeting. The nature of the facing sheets depends on the application for which the laminate is intended. Thus the facings may be made of a metal, wood or synthetic plastic material having properties appropriate to the temperatures and other conditions involved in the application. In a structural laminate of this type, it is important that the mechanical properties of the facings in tension or compression in direction perpendicular to the grain of the balsa be superior to the mechanical properties of balsa in tension or compression across the grain.

Balsa core panel 10 is formed of end grain balsa having an array of holes H punched therein, which holes serve to cut down the weight of the panel and hence the weight of the laminate formed thereby. The holes serve to reduce the mass of the balsa; hence the larger the diameter of the holes and the greater the concentration thereof, the less the weight.

It will be appreciated that the greater the concentration of holes in a given area of the panel, the narrower are the balsa bridges between adjacent holes and the weaker the resultant balsa structure. Assume, for example, that holes of like diameter are bored at equi-spaced positions in a panel, as shown in FIG. 4, along a first row $R_1$, with the centers of these holes all lying on the axis of this row, and that an identical row $R_2$ of holes is also punched in the panel, with the holes in the second row at positions corresponding to those in the first row. If now one seeks to increase the concentration of holes in the panel by bringing the axis of row $R_2$ as close as possible to the axis of row $R_1$, a distance $D_1$ between these axes will be reached where the corresponding holes in the rows are in abutting relation, as shown in FIG. 4. Hence while there will be balsa bridges in the spaces between adjacent holes in each row, there will be no bridges between the abutting holes in the two rows. The panel structure with this array of holes will therefore be considerably weakened.

In order to optimize the concentration of holes to lighten the structure without unduly weakening the structure, in a panel in accordance with the invention the holes in rows $R_1$ and $R_2$, as shown in FIG. 5, are in staggered relation so that the centers of each cluster of four holes in the two rows then lie at the apexes of a diamond. In this way, the axes of the two rows $R_1$ and $R_2$ can be spaced a distance $D_2$ from each other which is shorter than distance $D_1$ in FIG. 4; yet the four holes in the diamond formation in no instance are in abutting relation and are separated from each other by balsa bridges. The resultant panel is in a reticulated formation defined by the balsa bridges which separate all the holes.

While a reticulated panel of this type is not fully as strong as a solid panel, the strength of the panel is not markedly reduced, and the laminate structure, though much lighter, is still of high strength. Thus we have found that with a balsa core having a one-inch thickness and a dense array of punched holes of ⅜ inch diameter in accordance with the invention, a reduction in core weight of 30% is attainable, the strength thereof being about 80% as great as with an unpunched core panel. A 20% loss of structural strength is acceptable for most applications, particularly those where light weight is a major desideratum. Certainly, a reticulated balsa core laminate is structurally far superior to a typical laminate having about the same light weight but with a foam plastic core.

The Punching Mechanism

Referring now to FIGS. 6, 7 and 8, there is shown a gang-punching machine for punching the holes in the balsa core panel to provide an array constituted by alternately staggered rows of holes. The machine includes a bed 14 mounted on legs 15. Supported on vertical columns 16 above bed 14 is a die 17 which has two rows of die holes 17a and 17b formed therein at staggered positions to produce the staggered rows of holes in the balsa core panel shown in FIG. 3. Lying within bed 14 below die 17 is an elongated waste receptacle 18 which is adapted to receive the balsa plugs punched out through the die holes.

Placed above die 17 at a position parallel thereto is a stripper plate 19. Spacers 20 are interposed on columns 16 between the die and the stripper plate to define an opening 21 therebetween sufficient to receive a balsa panel to be punched. By changing the spacers, the size of the opening can be adjusted to accommodate panels of different thickness.

Supported on a beam 21 having a channel formation and projecting downwardly therefrom are two rows of punches $P_a$ and $P_b$. The punches in these rows are in staggered relation and extend into the correspondingly-positioned holes 19a and 19b in stripper plates 19. Punch beam 21 is reciprocable within limits determined by the position of adjustment nuts 22 and 23 on columns 16.

Attached to punch beam 21 are a pair of vertical rods 24 which extend upwardly through a support beam 25 mounted on columns 16. Compressible helical springs 26 surround rods 24 between stops 24' at the upper end of the rods and support beam 25. These springs serve to retract the rods so as to normally hold punch beam 21 at a raised position.

A pair of air pistons 27 are mounted below support beam 25, the pistons terminating in a pressure bar 28 pressed against punch beam 21. When the air pistons are actuated, the pistons 27' thereof are projected to cause pressure bar 28 to force punch beam 21 downwardly, thereby compressing springs 26 while causing the punches to penetrate the balsa panel in opening 21 and to pass into the holes of die 17. The balsa plugs punched out of the balsa panel are pushed into waste receptacle 18.

An indexing mechanism, not shown, serves to advance the balsa panel in a horizontal plane through opening 21 in incremental steps. At each step, the punching mechanism is actuated to punch two staggered rows of holes in the panel. The panel is indexed in this manner until the panel has punched therein an array of holes to create a reticulated structure.

The relationship of one of the punches $P_a$ to balsa wood panel BW can best be seen in FIG. 8. It will be seen that punch $P_a$, which may be of stainless or carbide steel, is of solid construction and has a threaded upper section held in punch beam 21 by upper and lower lock nuts 29 and 30. The lower end of the punch has a concave formation to provide a circular cutting edge. When the punch is forced downwardly, it pierces a hole in panel BW to produce a cylindrical plug CP which is shown separately in FIG. 9. This plug is deposited in receptacle 18.

While one can use rotating bits to drill holes in wood and to provide holes therein having a clean wall and edges, the use of rotating drills in the context of the present invention is not feasible. There is no practical way by which one can provide mechanisms to rotate two rows of closely spaced drills. Moreover, while it is normally possible to effectively punch paper, plastic, or metal sheets, punching operations are normally interdicted in wood. As noted in the Decker U.S. Pat. No. 1,757,828, because of the fibrous character and the flexibility of wood, punching holes in wood would normally result in unclean edges, and the wood would crack.

It has been discovered, however, that while normally one cannot produce clean punches in wood, by the use of punches having concave ends as shown, and with end-grain balsa as the wood to be punched, because of the parallel fibers of such material, the punch engages a tight phalanx of these fibers and punches out the phalanx without in any way disrupting the surrounding fibers which form the walls of the holes, thereby producing cleanly punched holes. Thus plug CP, as shown in FIG. 9, is composed of a neatly defined phalanx of parallel balsa fibers.

Lamination

In aircraft or other applications requiring lightweight laminates, aluminum is the preferred material for the skins to be bonded to a balsa wood core; for the inherent lightness of aluminum metal and that of a reticulated balsa core panel results in a laminate of exceptional light weight.

There are, however, two problems encountered with aluminum facings. A preferred adhesive for effecting an aluminum-to-balsa bond is a modified epoxy adhesive that is heat curable at relatively high temperature, such as 200° F. Suitable for this purpose is the Ciba Geigy epoxy adhesive known as "Reliabond 382-B."

Commercial balsa wood is normally kiln-dried to reduce its moisture content to about 10 to 12%. The steps necessary to kiln-dry wood and the recommended practices therefor are set out in Publication #188 of the U.S. Department of Agriculture Forest Service, Forest Products Laboratory. However, if kiln-dried wood is stored in a humid temperature, its moisture content may rise substantially. In any case, even if the balsa wood to which an aluminum skin is to be laminated has a moisture content of no more than 10%, because of hot curing necessary for the preferred epoxy adhesive, the heat will volatilize the moisture and the resultant vapors will interfere with effective lamination.

Hence to effect proper lamination, the balsa panel used in a laminate in accordance with the invention must first be kiln-dried to a moisture content of about 2 to 3%. And because the aluminum normally has an oxide film thereon which is resistant to epoxy bonding, this film must first be removed, preferably by etching the surface with hydrochloric acid. After the surface is etched, primer is brushed thereon and baked to adhere to the clean aluminum surface, the primer being of a composition appropriate to the epoxy adhesive used.

While there has been shown and described a preferred embodiment of a balsa-core sandwich laminate in accordance with the invention, it will be appreciated that many changes and modifications may be made therein without, however, departing from the essential spirit thereof.

I claim:

1. A structural sandwich laminate formed of thin facing sheets bonded to a core panel, said facings being constituted by aluminum sheets whose surfaces bonded to the core panel are etched whereby the surfaces are free of oxide film, said panel being formed of end-grain balsa having an array of closely spaced clear-through holes punched therein to define a reticulated balsa core of high strength and exceptionally low weight, said end grain balsa being composed of substantially parallel fibers which are at right angles to the faces of core panel whereby the holes punched therein have removed therefrom a phalanx of said fibers without disrupting the surrounding fibers and substantially degrading the strength of the panel, said array of holes being formed by alternative rows of equi-spaced holes in staggered relation, the holes having their centers at the apexes of a diamond, making possible a high concentration of holes with an adequate separation therebetween, said aluminum sheets being bonded to said panel by a heat-curable exoxy resin which cures at a relatively high temperature causing volatilization of moisture, and said balsa panel has a moisture content of about 2 to 3% whereby vapors will not be produced to interfere with curing.

* * * * *